United States Patent
Hyde (10) Patent No.: US 10,279,972 B2
(45) Date of Patent: May 7, 2019

(54) REUSABLE TIE

(71) Applicant: THE BOEING COMPANY, Chicago, IL (US)

(72) Inventor: Dennis F. Hyde, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 69 days.

(21) Appl. No.: 15/649,386

(22) Filed: Jul. 13, 2017

(65) Prior Publication Data
US 2019/0016512 A1    Jan. 17, 2019

(51) Int. Cl.
*B65D 63/10*    (2006.01)

(52) U.S. Cl.
CPC .... *B65D 63/1027* (2013.01); *B65D 2563/103* (2013.01); *B65D 2563/107* (2013.01); *B65D 2563/108* (2013.01)

(58) Field of Classification Search
CPC ............ Y10T 24/1498; B65D 63/1027; B65D 63/103; B65D 63/108; B65D 63/107
See application file for complete search history.

(56) References Cited

U.S. PATENT DOCUMENTS

| | | | | |
|---|---|---|---|---|
| 3,072,986 | A * | 1/1963 | Lefnaer | B65D 63/1027 24/16 PB |
| 5,690,522 | A | 11/1997 | Moreau | |
| 6,217,813 | B1 * | 4/2001 | Sorensen | B29C 33/46 264/318 |
| 6,681,451 | B1 * | 1/2004 | Adams | B65D 63/1027 24/16 PB |
| 2003/0159254 | A1 * | 8/2003 | Wendle | B65D 63/1027 24/16 PB |

OTHER PUBLICATIONS

Electriduct Inc., "Q-Knot Cable Ties", 2015, 3 pages.
Industria Products, "Cable Wrapz™—EPDM", accessed May 17, 2017, 18 pages. <http://www.rubberband.com/products/74/cable-wrapz--epdm>.
Parker, "EPR, EPM, EPDM, EPT", May 17, 2017, 1 page. <https://www.parker.com/literature/O-Ring%20Division%20Literature/Static%20Files/EPRvsEPDM.pdf>.

* cited by examiner

*Primary Examiner* — Robert Sandy
(74) *Attorney, Agent, or Firm* — Toler Law Group, P.C.

(57) ABSTRACT

A reusable tie includes a flexible shaft including an elastomeric material. The reusable tie also includes a plurality of ribs spaced along the flexible shaft. Each rib of the plurality of ribs encircles the flexible shaft. The reusable tie also includes a tab that includes the elastomeric material. The tab is coupled to the flexible shaft, and the tab defines a plurality of openings configured to receive the flexible shaft and to interact with the ribs to retain a position of the flexible shaft relative to the tab.

19 Claims, 9 Drawing Sheets

REUSABLE TIE

FIELD OF THE DISCLOSURE

The present disclosure relates to a tie used to wrap around objects.

BACKGROUND

Plastic tie wraps are in common use. Plastic tie wraps are single use devices that are available in a range of sizes. Removal of an installed plastic tie wrap involves use of a cutting tool which can result in damage to surrounding materials. For example, when a plastic tie wrap is used to hold a bundle of wires, cutting the plastic tie wrap may result in damage to one or more wires of the bundle of wires. In this example, a damaged wire may have to be replaced, which is time consuming and costly. Additionally, when cut, a plastic tie wrap forms multiple pieces of the removed plastic tie wrap, which may create a foreign object debris issue for plastic tie wraps used in a controlled environment. Additionally, handling, installing, and removing the plastic tie wraps contribute to physical fatigue (e.g., hand, wrist, shoulder, and neck fatigue) of users and other ergonomic issues.

SUMMARY

According to one implementation of the present disclosure, a reusable tie includes a flexible shaft including an elastomeric material. The reusable tie also includes a plurality of ribs spaced along the flexible shaft. Each rib of the plurality of ribs encircles the flexible shaft. The reusable tie also includes a tab that includes the elastomeric material. The tab is coupled to the flexible shaft, and the tab defines a plurality of openings configured to receive the flexible shaft and to interact with the ribs to retain a position of the flexible shaft relative to the tab.

According to another implementation of the present disclosure, a system includes at least one mold having openings that are shaped to form a reusable tie in response to injection of elastomeric material. The openings include a flexible shaft opening portion and a plurality of rib opening portions that are spaced along the flexible shaft opening portion. Each rib opening portion of the plurality of rib opening portions encircles the flexible shaft opening portion. The openings further include a tab opening portion proximate to the flexible shaft opening portion. The tap opening portion defines a plurality of openings in a tab of the reusable tie, and each opening of the plurality of openings is configured to receive a flexible shaft of the reusable tie and to interact with at least one rib of a plurality of ribs to retain a position of the flexible shaft relative to the tab. The system also includes an injector configured to inject an elastomeric material into the openings of the at least one mold to form the reusable tie.

According to another implementation of the present disclosure, a method of forming a reusable tie includes forming a flexible shaft including an elastomeric material. The method also includes forming a plurality of ribs spaced along the flexible shaft. Each rib of the plurality of ribs encircles the flexible shaft. The method also includes forming a tab coupled to the flexible shaft. The tab is coupled to the flexible shaft, and the tab defines a plurality of openings configured to receive the flexible shaft and to interact with the ribs to retain a position of the flexible shaft relative to the tab.

One advantage of the above-described implementations is that a reusable tie can be fastened and removed by a user with little effort. For example, a cutting tool does not need to be used to remove the reusable tie (e.g., a tie that secures a bundle of wires) after use, and thus, the reusable tie is not cut into multiple pieces upon removal. As a result, there is a low likelihood that the wires will be damaged upon removal of the reusable tie and a low likelihood that portions of the reusable tie will become foreign object debris upon removal. Because the reusable tie can be reused after the reusable tie is removed from securing the bundle of wires, the reusable tie may result in economic savings. Additionally, the features, functions, and advantages that have been described can be achieved independently in various implementations or may be combined in yet other implementations, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

An apparatus (e.g., a reusable tie) includes a shaft, a plurality of ribs spaced along the shaft, and a tab coupled to the shaft. The tab includes a plurality of openings configured to receive the shaft. The reusable tie is formed of an elastomeric material. The reusable tie may be wrapped around one or more objects. For example, the reusable tie may secure a bundle of wires when the shaft is inserted through one of the openings. The reusable tie may be removed by pulling on the tab. To illustrate, pulling the tab stretches the openings of the tab so that the shaft and the encircling ribs are easily removable from the openings.

Figure 1:
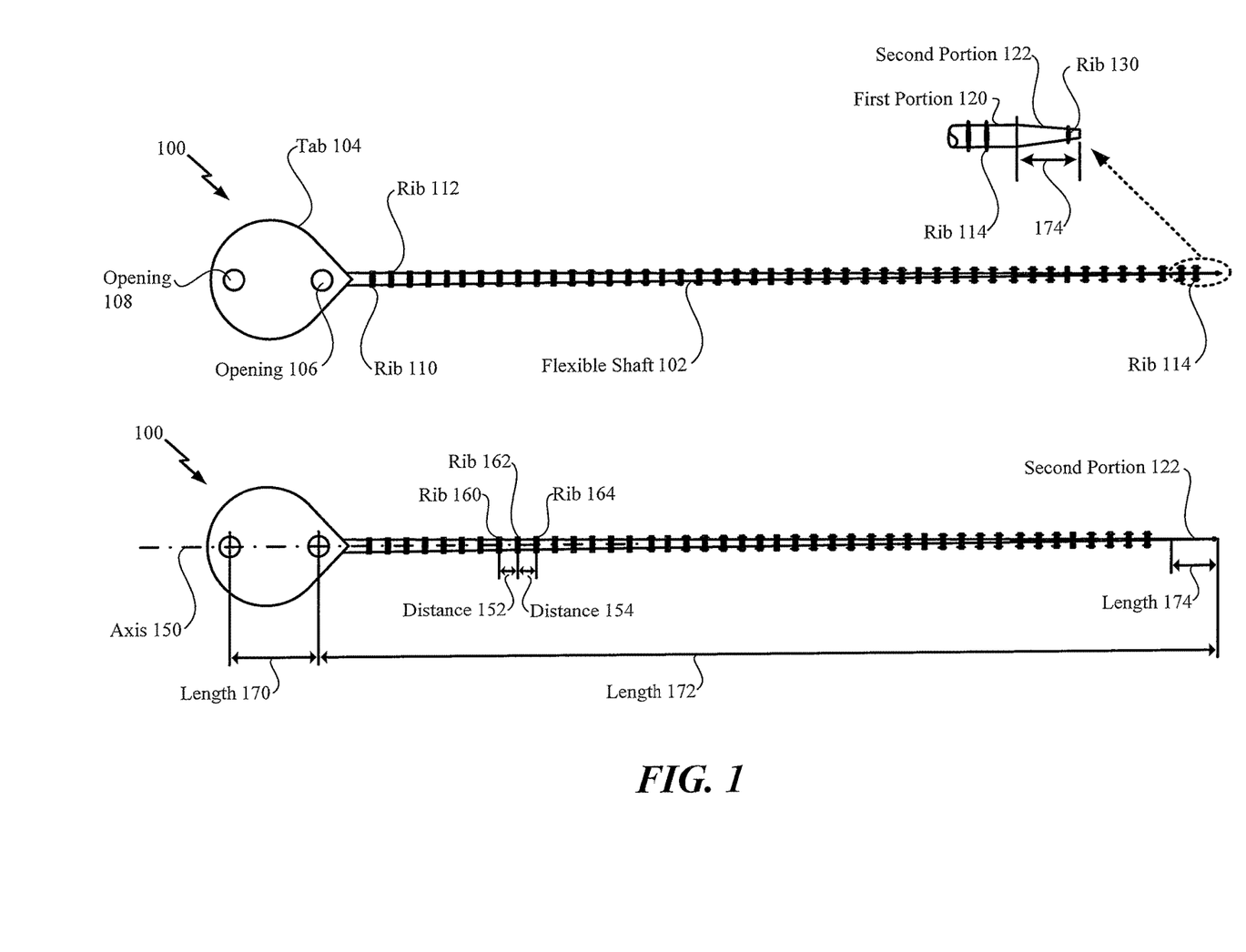
FIG. 1 is a diagram of a reusable tie.

FIG. 1 is a diagram of a reusable tie 100 that is operable to bundle a plurality of wires. As a non-limiting example, the reusable tie 100 is used by aircraft technicians to bundle together wires that are routed through an aircraft during an aircraft component installation process. Although described with respect to wire bundling, the reusable tie 100 is usable to bundle or secure other objects. As non-limiting examples, the reusable tie 100 is usable to bundle keys, pencils, etc.

The reusable tie 100 includes a flexible shaft 102 that is coupled to (e.g., integral with) a tab 104. The flexible shaft 102 is tapered and may also be referred to as a "tapered flexible shaft". The flexible shaft 102 and the tab 104 are comprised of an elastomeric material. According to one implementation, the elastomeric material includes a thermoplastic elastomer. According to another implementation, the elastomeric material includes ethylene-propylene rubber. According to yet another implementation, the elastomeric material includes a synthetic rubber.

The elastomeric material of the flexible shaft 102 and the tab 104 increases the life expectancy of the reusable tie 100 compared to materials used for other ties used to bundle wires. For example, the elastomeric material has a hardness value that is greater than or equal to fifty on an A-Type durometer scale. Thus, the elastomeric material is not easily subjected to indentation or wear and tear. The elastomeric material is stretchable from a resting state by approximately thirty percent without breaking. Thus, the elastomeric material of the flexible shaft 102 and the tab 104 is flexible.

The flexible shaft 102 includes a first portion 120 and a second portion 122. The first portion 120 of the flexible shaft 102 is coupled to the tab 104. For example, the first portion 120 is positioned between the tab 104 and the second portion 122, and the second portion 122 corresponds to an end of the flexible shaft 102. As illustrated in FIG. 1, the flexible shaft 102 is tapered (e.g., a continuously tapered flexible shaft).

A plurality of ribs is spaced along the flexible shaft. Each rib of the plurality of ribs encircles the flexible shaft 102. The plurality of ribs includes at least a rib 110, a rib 112, a rib 114, a rib 160, a rib 162, and a rib 164. The rib 110 is the first rib of the plurality of ribs, and the rib 114 is the last rib of the plurality of ribs. The plurality of ribs includes N ribs, where N is a positive integer greater than two. For example, if N is equal to twenty, the plurality of ribs includes twenty ribs, and the rib 114 is the twentieth rib. The plurality of ribs is evenly spaced along the first portion 120 of the flexible shaft 102. For example, a distance 152 between the rib 160 and the rib 162 is equal to a distance 154 between the rib 162 and the rib 164. According to one implementation, each rib of the plurality of ribs extends 0.015 centimeters (cm) beyond the corresponding section of the flexible shaft 102. For example, if the diameter of the flexible shaft 102 is 5 cm at a particular section, a diameter of a rib at the particular section is 5.03 cm. The second portion 122 of the flexible shaft 102 includes a single rib 130. According to one implementation, the single rib 130 extends 0.005 cm beyond the second portion 122 of the flexible shaft 102. For example, if a diameter of second portion of the flexible shaft is 0.5 cm, a diameter of the single rib 130 is 0.51 cm. The single rib 130 is smaller than the other ribs (e.g., the rib 110, the rib 112, etc.) because the single rib 130 is not used to retain the position of the flexible shaft 102 and the tab 104. The single rib 130 is used for other purposes (e.g., user grip, etc.).

The tab 104 includes a plurality of openings. For example, the tab 104 includes an opening 106 and an opening 108. In the example illustrated in FIG. 1, the openings 106, 108 are aligned with an axis 150 of the flexible shaft 102. The opening 106 has the same diameter as the opening 108. The diameter of the openings 106, 108 is shaped to hold the flexible shaft 102 when the flexible shaft 102 is looped through the opening 106 or the opening 108.

For example, the second portion 122 of the flexible shaft 102 is configured to be inserted into the opening 106. If the second portion 122 of the flexible shaft 102 is inserted into the opening 106, the flexible shaft 102 (and the tab 104) forms an enclosed loop (e.g., to hold a bundle of wires). To adjust the size of the enclosed loop after the second portion 122 of the flexible shaft 102 is inserted into the opening 106, the flexible shaft 102 is further pulled through the opening 106. For example, the size of the enclosed loop is decreases (e.g., gets tighter) if more of the flexible shaft 102 is pulled through the opening 106.

Figure 3:
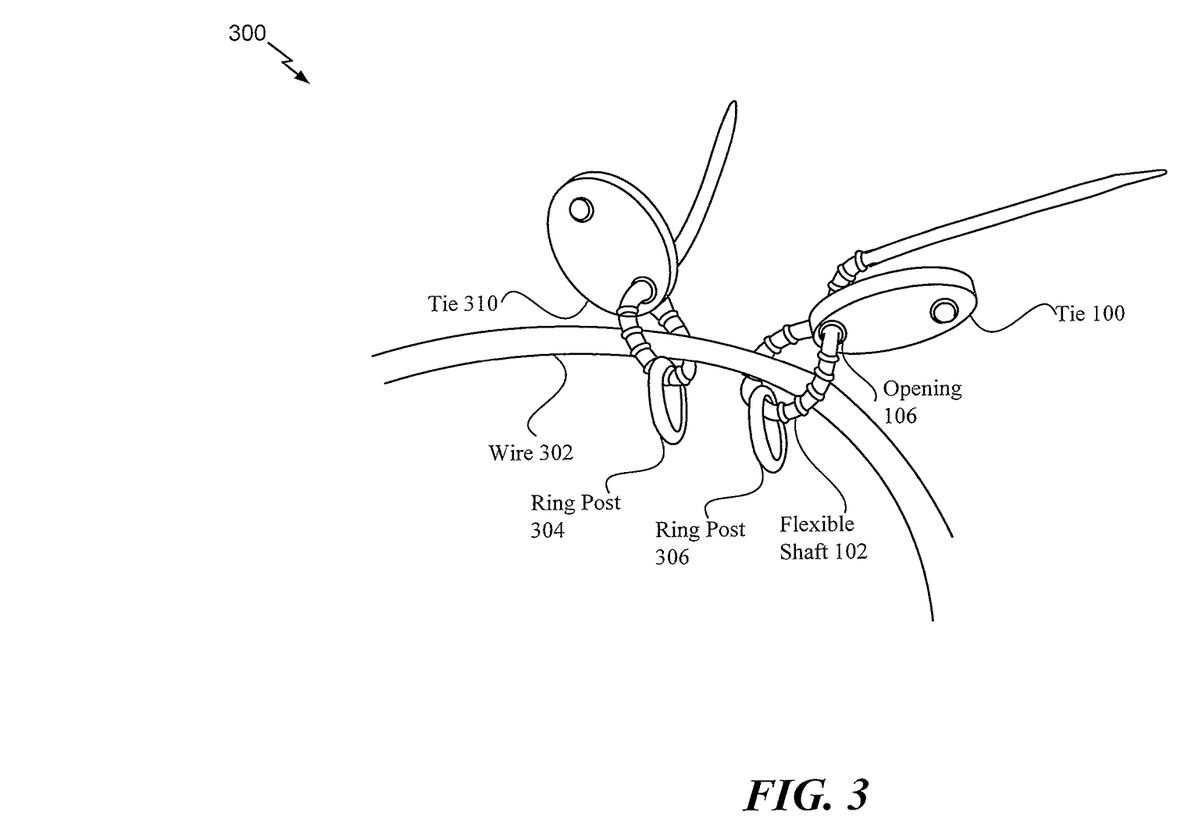
FIG. 3 depicts a device that includes the reusable tie of FIG. 1.

The ribs retain a relative position of the flexible shaft 102 and the tab 104. For example, if the flexible shaft 102 is pulled through the opening 106 such that the rib 160 is inserted into the opening 106, the enclosed loop has a circumference that is approximately equal to the distance between the rib 160 and the tab 104. The rib 160 is larger than the opening 106 (and the opening 108) so the position of the flexible shaft 102 and the tab 104 is retained when the rib 160 is inserted into the opening 106. The second portion 122 of the flexible shaft 102 is also configured to be inserted into the opening 108 (as illustrated in FIG. 3) to increase the amount of force needed to disengage the flexible shaft 102 from the tab 104.

The tab 104 is configured to release the flexible shaft 102 in response to a pulling force applied to the tab 104. As a non-limiting example, if an aircraft technician pulls on the tab 104 while the rib 160 is coupled to the tab 104, the rib 160 is decoupled from the tab 104 and the remainder of the flexible shaft 102 (e.g., from the rib 160 to the single rib 130) can be released from the opening 106. For example, pulling the tab 104 stretches the openings 106, 108 of the tab 104 so that the flexible shaft 102 and the encircling ribs are easily removable from the openings 106, 108. Pulling the flexible shaft 102 (instead of the tab 104) fails to stretch the openings 106, 108 at an angle that facilitates the release of the flexible shaft 102.

In a particular implementation, a length 170 between the openings 106, 108 is 1.0 centimeters (cm) and a length 174 of the second portion 122 of the flexible shaft 102 is 0.5 cm. According to one implementation, a length 172 of the flexible shaft 102 is 6.0 cm, a diameter of the flexible shaft 102 is 0.125 cm near the tab 104, a diameter of the flexible shaft 102 is 0.062 cm at the rib 114, and a color of the flexible shaft 102 is black. According to another implementation, the length 172 of the flexible shaft 102 is 8.0 cm, the diameter of the flexible shaft 102 is 0.187 cm near the tab 104, the diameter of the flexible shaft 102 is 0.125 at the rib 114, and a color of the flexible shaft 102 is orange. According to another implementation, the length 172 of the flexible shaft 102 is 16.0 cm, the diameter of the flexible shaft 102 is 0.187 cm near the tab 104, the diameter of the flexible shaft 102 is 0.125 at the rib 114, and a color of the flexible shaft 102 is black.

Figure 2:
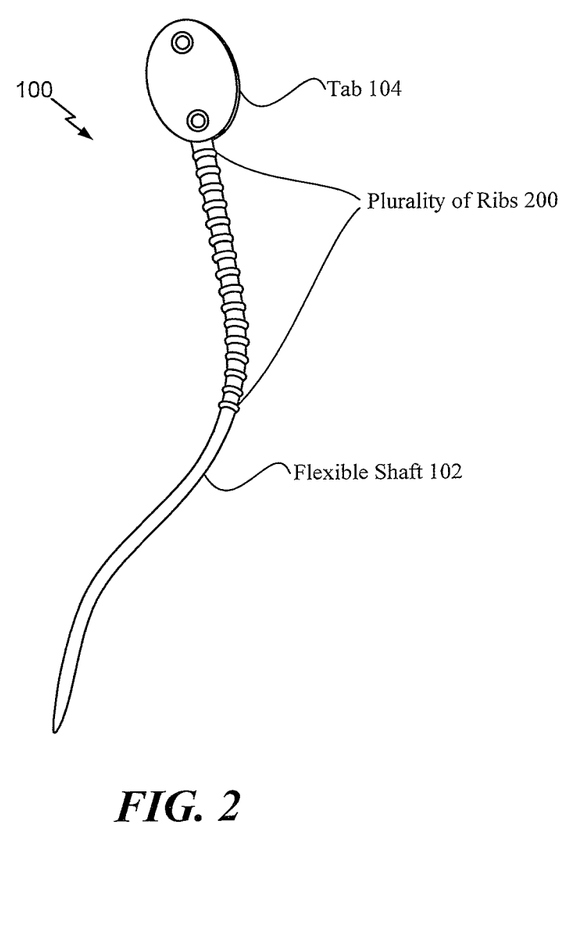
FIG. 2 is another diagram of the reusable tie of FIG. 1.

Referring to FIG. 2, another illustrative example of the reusable tie 100 is shown. The reusable tie 100 includes the flexible shaft 102 coupled to the tab 104. A plurality of ribs 200 is spaced along the flexible shaft 102. The plurality of ribs 200 includes the rib 110, the rib 112, the rib 114, the rib 160, the rib 162, and the rib 164.

The reusable tie 100 of FIGS. 1 and 2 enables an aircraft technician to bundle wires by wrapping the flexible shaft 102 around the wires and inserting the second portion 122 of the flexible shaft 102 into the opening 106. The technician may tighten the flexible shaft 102 around wires by further pulling the flexible shaft 102 through the opening 106, until one or more ribs pass through the opening 106. The reusable tie 100 is removable by pulling on the tab 104. Thus, cutting tools do not need to be used to remove the reusable tie 100 after use, and thus, the reusable tie 100 is not cut into multiple pieces upon removal. As a result, there is a low likelihood that the wires will be damaged (e.g., cut) upon removal of the reusable tie 100 and a low likelihood that portions of the reusable tie 100 will become foreign object debris upon removal of the reusable tie 100. Additionally, because the reusable tie 100 can be removed without undergoing a cutting process, the reusable tie 100 is reusable. Thus, the reusable tie 100 may result in economic savings. Additionally, the reusable tie 100 is a non-marring tie. For example, the reusable tie 100 is less subject to scratch, dent, or poke an object than a plastic tie wrap. The reusable tie 100 may also be used to restrain fragile objects, such as fiber optics or antennas. Due to reusability, the reusable tie 100 is more environmentally friendly than plastic tie wraps.

Referring to FIG. 3, a device 300 that includes reusable electrical ties coupled to a wire is shown. The device 300 includes a ring post 304 and a ring post 306. The ring posts 304, 306 may be coupled to components (e.g., fixed components) along an aircraft. For example, the ring posts 304, 306 may be attached to an airplane structure (e.g., attached to a component or surface of an airplane). The flexible shaft 102 of the reusable tie 100 is inserted into the ring post 306, and a flexible shaft of a reusable tie 310 is inserted into the ring post 304. The reusable tie 310 has a similar configuration as the reusable tie 100.

A first portion of a wire 302 is placed adjacent to the ring post 306. The flexible shaft 102 (inserted into the ring post 306) is wrapped around the first portion of the wire 302 and inserted into the opening 106 to couple the reusable tie 100 to the wire 302 and to the ring post 306. In a similar manner, a second portion of the wire 302 is placed adjacent to the ring post 304. The flexible shaft of the reusable tie 310 is wrapped around the second portion of the wire 302 and inserted into an opening of the reusable tie 310 to couple the reusable tie 310 to the wire 302 and to the ring post 304.

Because the reusable ties 100, 310 are removable by pulling on the respective tabs, cutting tools do not need to be used to remove the reusable ties 100, 310 from the ring posts 304, 306 after use. Thus, the reusable ties 100, 310 are not cut into multiple pieces upon removal. As a result, there is a low likelihood that the wire 302 and the rings 304, 306 will be damaged (e.g., cut) upon removal of the reusable ties 100, 310 and a low likelihood that portions of the reusable ties 100, 310 will become foreign object debris upon removal of the reusable ties 100, 310. Additionally, because the reusable ties 100, 310 can be removed without undergoing a cutting process, the reusable ties 100, 310 are reusable. Thus, the reusable ties 100, 310 may result in economic savings.

Figure 4:
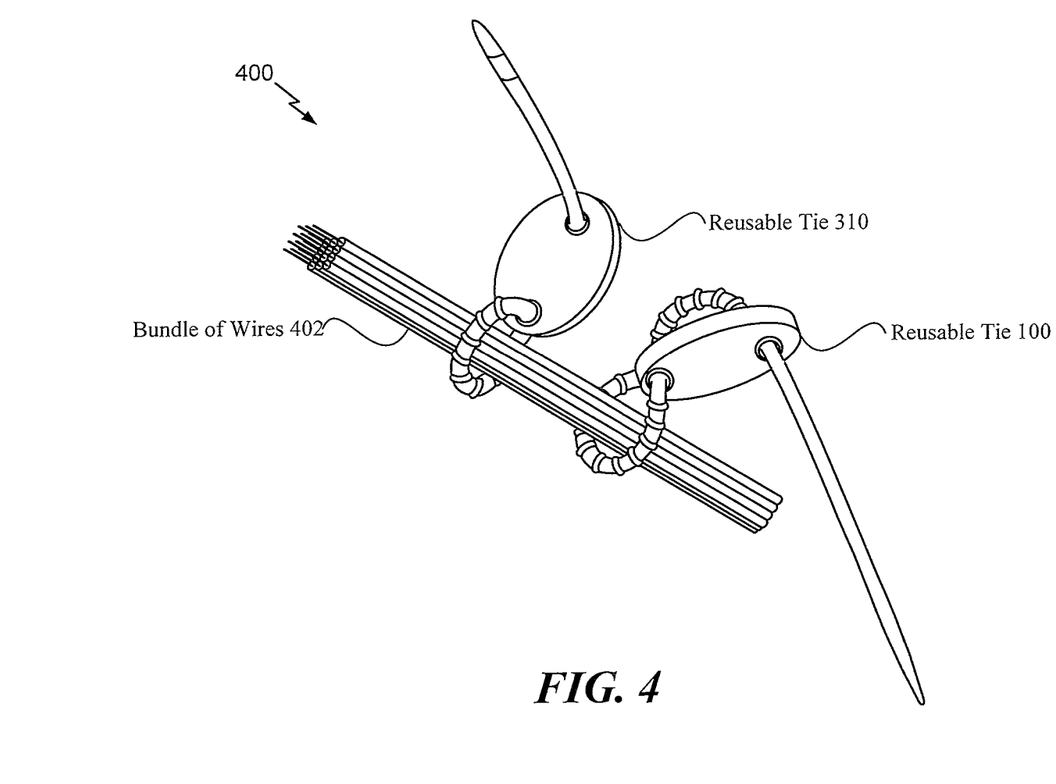
FIG. 4 depicts wires bundled together by the reusable tie of FIG. 1.

Referring to FIG. 4, a device 400 that includes reusable ties coupled to a plurality of wires is shown. The device 400 includes a bundle of wires 402. The reusable tie 100 is coupled to the bundle of wires 402 using the techniques described above, and the reusable tie 310 is coupled to the bundle of wires 402 using the techniques described above. Because the reusable ties 100, 310 are removable by pulling on the respective tabs, cutting tools do not need to be used to remove the reusable ties 100, 310 from the bundle of wires 402 after use. Thus, the reusable ties 100, 310 are not cut into multiple pieces upon removal. As a result, there is a low likelihood that the bundle of wires 402 will be damaged (e.g., cut) upon removal of the reusable ties 100, 310 and a low likelihood that portions of the reusable ties 100, 310 will become foreign object debris upon removal of the reusable ties 100, 310. Additionally, because the reusable ties 100, 310 can be removed without undergoing a cutting process, the reusable ties 100, 310 are reusable. Thus, the reusable ties 100, 310 may result in economic savings.

Figure 5:
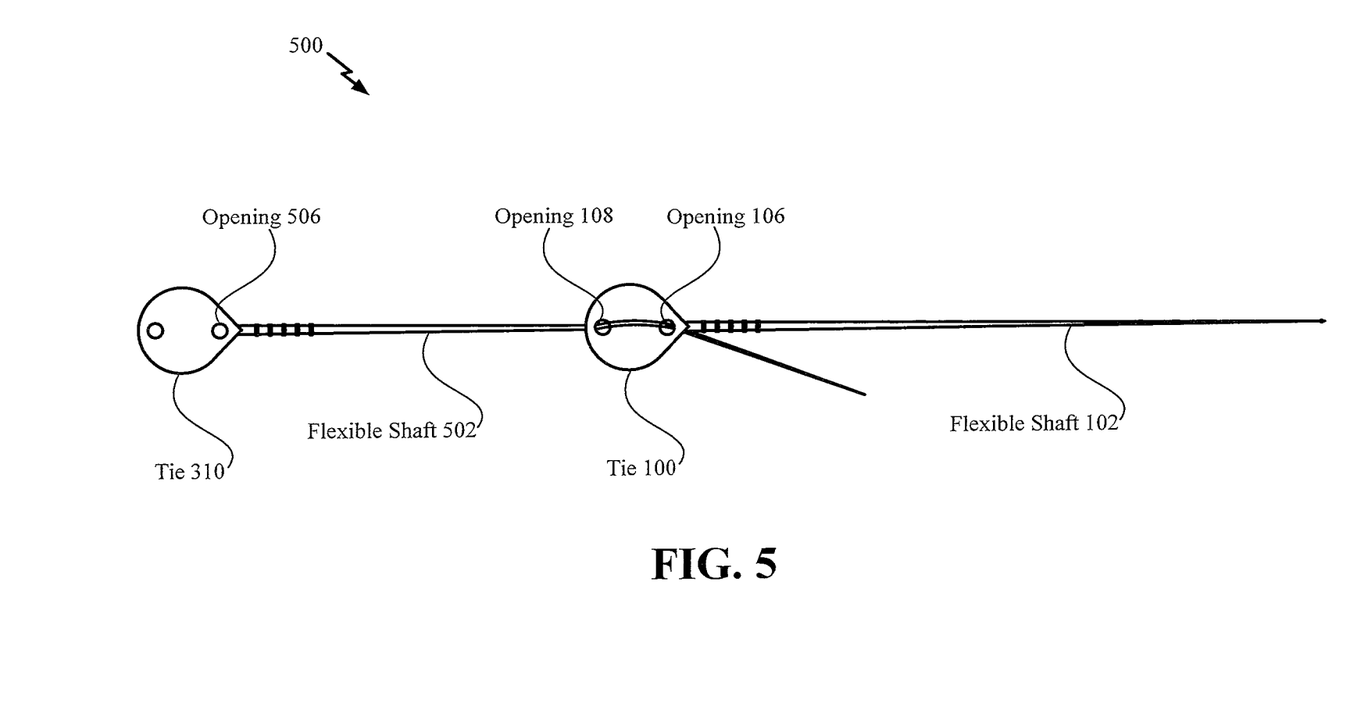
FIG. 5 depicts two reusable ties coupled together.

Referring to FIG. 5, an extended reusable tie 500 is shown. The extended reusable tie 500 is formed by combining (e.g., coupling) two or more reusable ties. For example, the extended reusable tie 500 is formed by combining the reusable tie 100 and the reusable tie 310. To illustrate, a flexible shaft 502 of the reusable tie 310 is inserted into the opening 108 of the reusable tie 100 and into the opening 106 of the reusable tie 100. The flexible shaft 502 is pulled through the openings 108, 106 until ribs pass through the openings 108, 106 and a desired length of the extended reusable tie 500 is achieved.

The extended reusable tie 500 may be wrapped around an object, such as a bundle of wires. After the extended reusable tie 500 is wrapped around the object, the flexible shaft 102 is inserted into an opening 506 of the reusable tie 310 to form an enclosed loop that surrounds the object. Thus, the reusable ties 100, 310 may be combined to form the extended reusable tie 500 that is configured to bundle objects having a large diameter. For example, an airplane technician may form the extended reusable tie 500 to bundle wires that are too large to be bundled by a single reusable tie 100, 310. Although two reusable ties 100, 310 are combined in FIG. 5, in other implementations, more than two reusable ties may be combined using similar techniques.

Figure 6A:
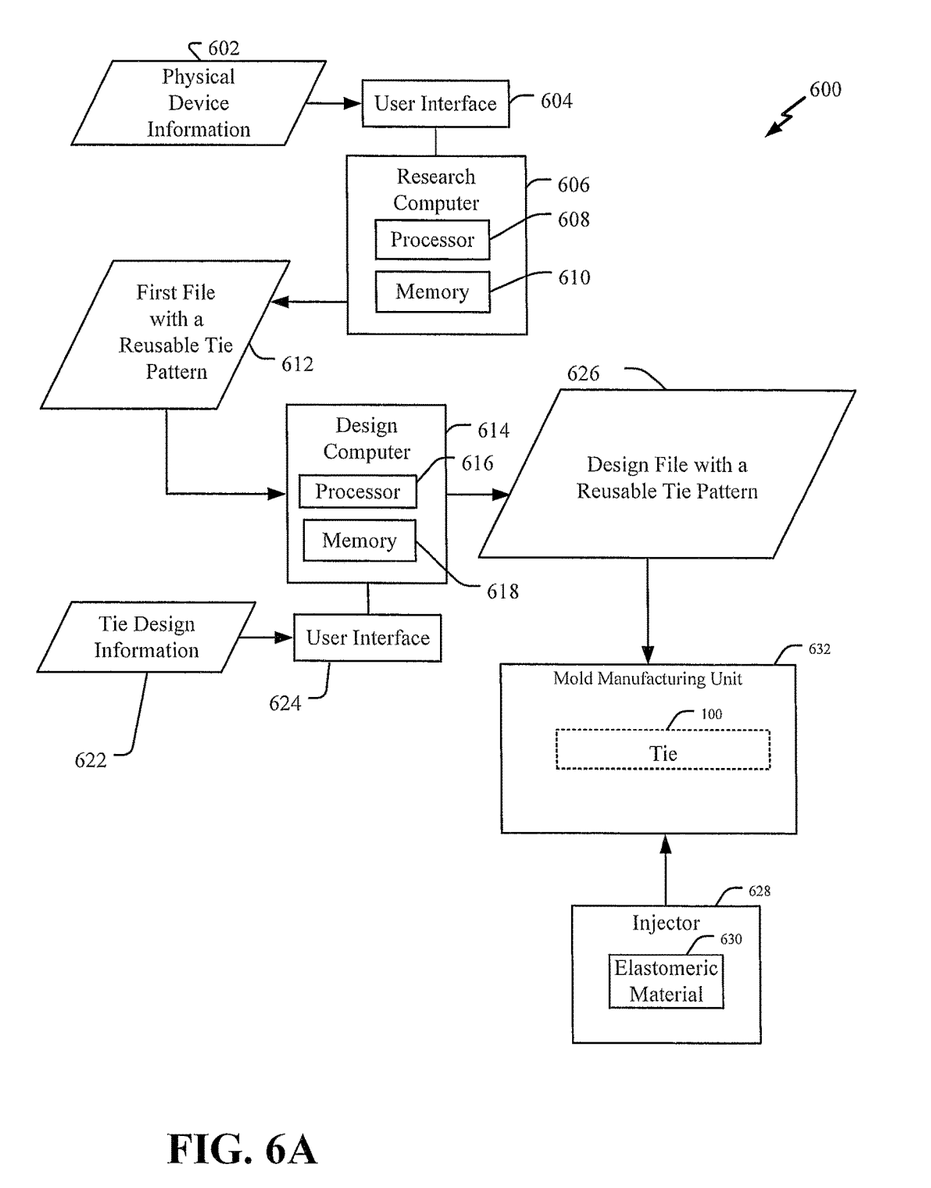
FIG. 6A depicts a manufacturing process for forming the reusable tie of FIG. 1.

Referring to FIG. 6A, a particular illustrative implementation of a manufacturing process is depicted and generally designated 600. In FIG. 6A, physical device information 602 is received at the manufacturing process 600, such as at a research computer 606. The physical device information 602 includes design information representing at least one physical property of a device, such as the reusable tie 100 of FIG. 1, the reusable tie 310 of FIG. 3, or both. For example, the physical device information 602 includes physical parameters, material characteristics, and structure information that is entered via a user interface 604 coupled to the research computer 606. The research computer 606 includes a processor 608, such as one or more processing cores, coupled to a computer readable medium such as a memory 610. The memory 610 stores computer readable instructions that are executable to cause the processor 608 to transform the physical device information 602 to comply with a file format and to generate a first file 612 describing a reusable tie pattern.

The first file 612 is used in conjunction other information, such as tie design information 622 received via a user interface 624 coupled to a design computer 614. The tie design information 622 includes design information representing at least one physical property of a device (e.g., the reusable tie 100 of FIG. 1, the reusable tie 310 of FIG. 3, or both). According to one implementation, the tie design information 622 includes material information of the reusable tie 100 and the physical device information 602 includes pattern information of the reusable tie 100. The design computer 614 includes a processor 616 and a memory 618. The design computer 614 is configured to transform the design information, including the tie design information 622, to comply with a file format. To illustrate, the file formation includes a database binary file format representing planar geometric shapes, text labels, and other information about a tie layout in a hierarchical format, such as a Graphic Data System (GDSII) file format. The design computer 614 is configured to generate a data file including the transformed design information, such as a design file 626 that includes information describing the reusable tie 100 of FIG. 1, the reusable tie 310 of FIG. 3, or both.

The design file 626 is received at a mold manufacturing unit 632, and the mold manufacturing unit 632 shapes a mold into a design associated with the reusable tie 100 according to transformed information in the design file 626. An injector 628 injects elastomeric material 630 into the shaped mold to form the reusable tie 100.

Figure 6B:
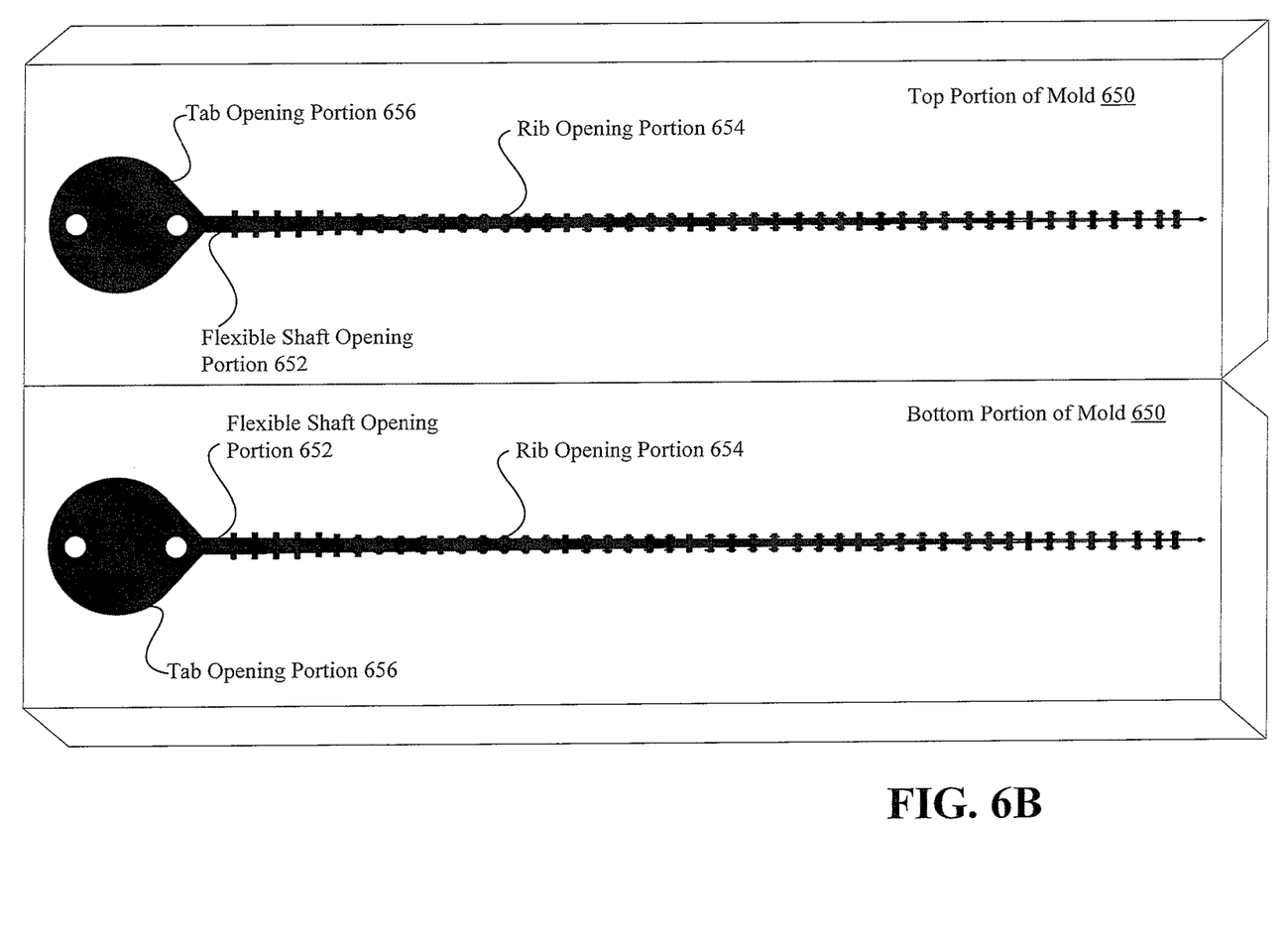
FIG. 6B depicts a mold having openings that are shaped to form the reusable tie of FIG. 1.

Referring to FIG. 6B, a mold 650 that includes multiple openings to form a reusable tie is shown. The openings in the mold 650 may be shaped by the mold manufacturing unit 632 of FIG. 6A.

In FIG. 6B, the mold 650 includes a top portion and a bottom portion. Each portion of the mold 650 includes similar opening patterns such that when the top portion is placed on top of the bottom portion, the opening patterns of the top portion overlap the opening patterns of the bottom portion. Each portion of the mold 650 includes a flexible shaft opening portion 652 and a plurality of rib opening portions. The plurality of rib opening portions is spaced along the flexible shaft opening portion 652. As an example, a rib opening portion 654 of the plurality of rib opening portions encircles the flexible shaft opening portion 652. Each portion of the mold 650 also includes a tab opening portion 656 that is proximate to the flexible shaft opening portion 652. The tap opening portion 656 defines the openings 106, 108 in the tab 104. In response to placing the top portion of the mold 650 on to the bottom portion of the mold 650, the injector 628 of FIG. 6B injects the elastomeric material 630 into the openings of the mold 650 to generate the reusable tie 100.

Figure 7:
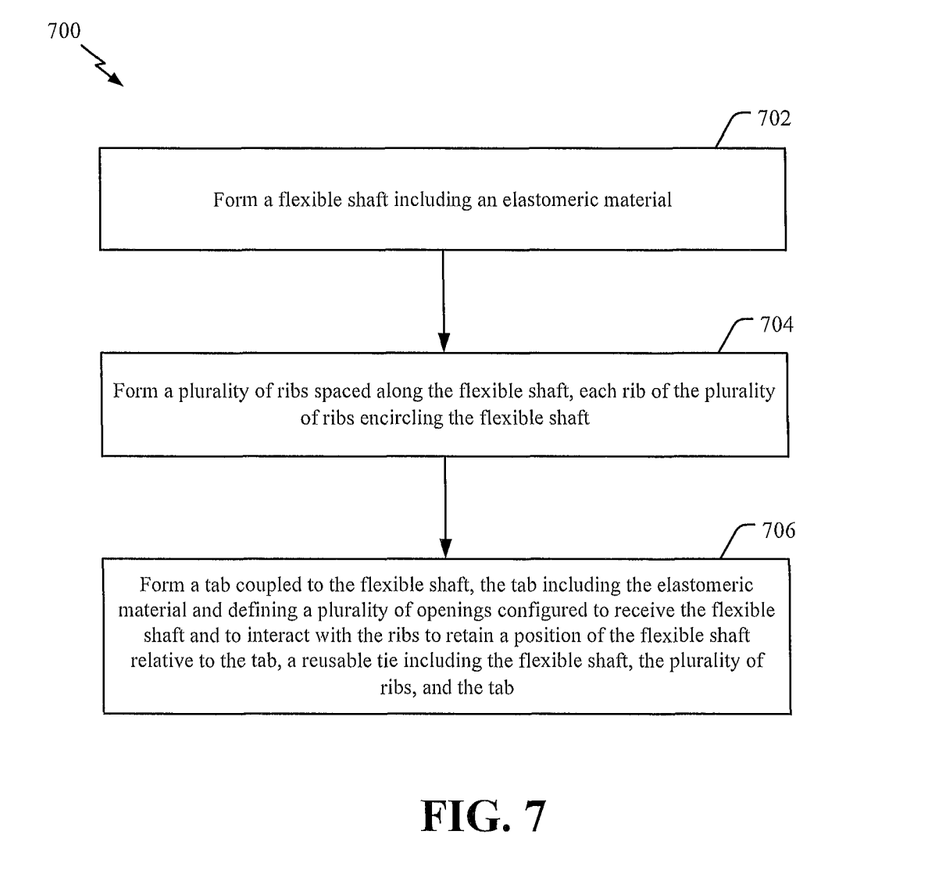
FIG. 7 is a method of forming a reusable tie.

Referring to FIG. 7, a method 700 for forming a reusable tie is shown. The method 700 is performed by the one or more devices of the manufacturing process 600 of FIG. 6A.

The method 700 includes forming a flexible shaft comprising an elastomeric material, at 702. For example, referring to FIGS. 1 and 6, the injector 630 injects the elastomeric material 630 into the mold 632 to form the flexible shaft 102 of the reusable tie 100.

The method 700 includes forming a plurality of ribs spaced along the flexible shaft, at 704. Each rib of the plurality of ribs encircles the flexibles shaft. For example, referring to FIGS. 1, 2, and 6, the injector 628 injects the elastomeric material 630 into the mold 632 to form the plurality of ribs 200.

The method 700 also includes forming a tab coupled to the flexible shaft, at 706. The tab includes the elastomeric material and defines a plurality of openings configured to receive the flexible shaft and to interact with the ribs to retain a position of the flexible shaft relative to the tab. For example, referring to FIGS. 1 and 6, the injector 628 injects the elastomeric material 630 into the mold 632 to form the tab 104 of the reusable tie 100.

The method 700 of FIG. 7 enables a reusable tie (e.g., the reusable tie 100) to be formed. For example, the reusable tie 100 is removable (and thus reusable) by pulling on the tab 104. Thus, cutting tools do not need to be used to remove the reusable tie 100 after use, and thus, the reusable tie 100 is not cut into multiple pieces upon removal. As a result, there is a low likelihood that the wires will be damaged (e.g., cut) upon removal of the reusable tie 100 and a low likelihood that portions of the reusable tie 100 will become foreign object debris upon removal of the reusable tie 100. Additionally, because the reusable tie 100 can be removed without undergoing a cutting process, the reusable tie 100 is reusable. Thus, the reusable tie 100 may result in economic savings.

Figure 8:
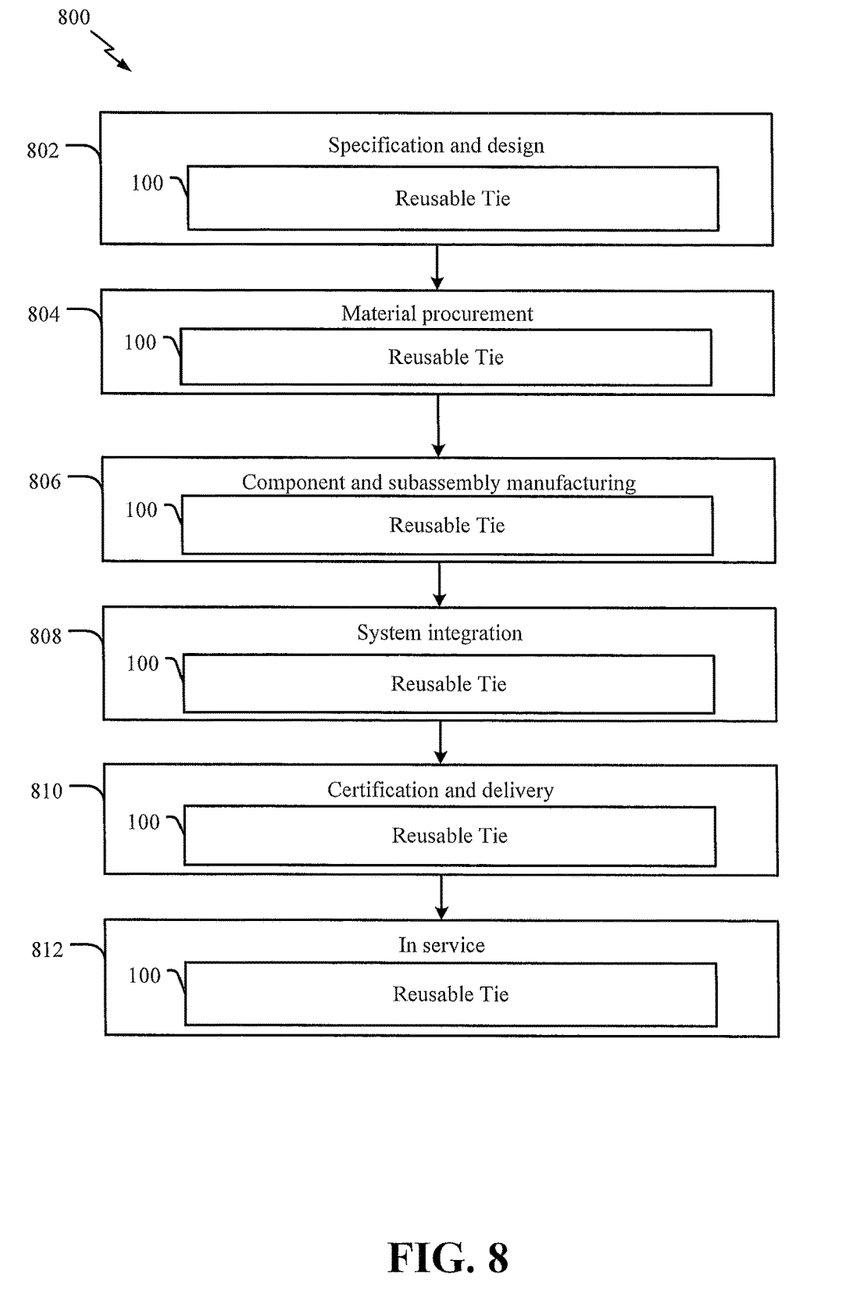
FIG. 8 is a flowchart of an example of a method of operating a system for forming a reusable tie.

Referring to FIG. 8, a flowchart of an illustrative example of a method of operating a system for forming a reusable tie is shown and designated 800. During pre-production, the exemplary method 800 includes, at 802, specification and design of a reusable tie, such as the reusable tie 100 of FIG. 1. At 804, the method 800 includes material procurement. For example, the method 800 may include procuring materials (e.g., the elastomeric material) for the reusable tie 100.

During production, the method 800 includes, at 806, component and subassembly manufacturing and, at 808, system integration of the reusable tie 100. At 810, the method 800 includes certification and delivery of the reusable tie 100 and, at 812, placing the reusable tie 100 in service.

Each of the processes of the method 800 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A reusable tie comprising:
a flexible shaft comprising an elastomeric material, wherein the flexible shaft is tapered;
a plurality of ribs spaced along the flexible shaft, each rib of the plurality of ribs encircling the flexible shaft; and
a tab coupled to the flexible shaft, the tab comprising the elastomeric material and defining a plurality of openings configured to receive the flexible shaft and to interact with at least one rib of the plurality of ribs to retain a position of the flexible shaft relative to the tab.

2. The reusable tie of claim 1, wherein the elastomeric material comprises a thermoplastic elastomer.

3. The reusable tie of claim 1, wherein the elastomeric material has a hardness value that is greater than or equal to fifty on an A-Type durometer scale.

4. The reusable tie of claim 1, wherein the elastomeric material comprises ethylene-propylene rubber.

5. The reusable tie of claim 1, wherein the elastomeric material comprises a synthetic rubber.

6. The reusable tie of claim 1, wherein the plurality of openings comprises two openings substantially aligned with an axis of the flexible shaft.

7. The reusable tie of claim 1, wherein the plurality of openings comprises a first opening and a second opening, the first opening and the second opening having substantially the same diameter.

8. The reusable tie of claim 1, wherein a first portion of the flexible shaft is proximate to the tab, and wherein a second portion of the flexible shaft is proximate to the first portion.

9. The reusable tie of claim 8, wherein the second portion includes a single rib of the plurality of ribs.

10. The reusable tie of claim 9, wherein the single rib has a diameter that is less than a diameter of each of the other ribs of the plurality of ribs.

11. The reusable tie of claim 10, wherein the other ribs are substantially evenly spaced along the first portion of the shaft.

12. A method of forming a reusable tie, the method comprising:
forming, at a manufacturing device, a flexible shaft comprising an elastomeric material, wherein the flexible shaft is tapered;
forming, at the manufacturing device, a plurality of ribs spaced along the flexible shaft, each rib of the plurality of ribs encircling the flexible shaft; and
forming, at the manufacturing device, a tab coupled to the flexible shaft, the tab comprising the elastomeric material and defining a plurality of openings configured to receive the flexible shaft and to interact with at least one rib of the plurality of ribs to retain a position of the flexible shaft relative to the tab,
the reusable tie comprising the flexible shaft, the plurality of ribs, and the tab.

13. The method of claim 12, wherein the tab is formed to adjust an angle of an opening of the plurality of openings based on a pulling force applied to the tab.

14. The apparatus of claim 12, further comprising injecting the elastomeric material into a mold to form the flexible shaft and the tab.

15. The apparatus of claim 12, wherein the plurality of openings comprises a first opening and a second opening, the first opening and the second opening having substantially the same diameter.

16. The apparatus of claim 12, wherein the plurality of openings comprises two openings substantially aligned with an axis of the flexible shaft.

17. A system comprising:
at least one mold having openings that are shaped to form a reusable tie in response to injection of elastomeric material, the openings comprising:
a flexible shaft opening portion that is tapered;
a plurality of rib opening portions that are spaced along the flexible shaft opening portion, each rib opening portion of the plurality of rib opening portions encircling the flexible shaft opening portion; and
a tab opening portion proximate to the flexible shaft opening portion, the tab opening portion defining a plurality of openings in a tab of the reusable tie, the plurality of openings configured to receive a flexible shaft of the reusable tie and to interact with at least one rib of a plurality of ribs to retain a position of the flexible shaft relative to the tab; and
an injector configured to inject an elastomeric material into the openings of the at least one mold to form the reusable tie.

18. The system of claim 17, wherein the elastomeric material comprises ethylene-propylene rubber.

19. The system of claim 17, wherein the elastomeric material comprises a synthetic rubber.

* * * * *